3,029,138
METHOD OF DESTROYING WEEDS
Norman K. Sundholm, Middlebury, Winchester L. Hubbard, Woodbridge, and John A. Riddell, Hamden, Conn., assignors to United States Rubber Company, New York, N.Y., a corporation of New Jersey
No Drawing. Filed Oct. 3, 1958, Ser. No. 765,054
8 Claims. (Cl. 71—2.3)

This invention relates to improvements in herbicides. We have found that certain 2-amino-1,4-napthoquinones are effective herbicides. These chemicals may be represented by the general formula

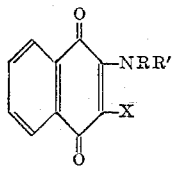

wherein R and R' are each a member selected from the group consisting of hydrogen and alkyl, and X is a member selected from the group consisting of hydrogen and methyl and chlorine. The chemicals are known compounds. The parent compound 2-amino-1,4-naphthoquinone is prepared by the method of Fieser and Fieser, J. Am. Chem. Soc., 56, 1576 (1934). 2,4-dinitro-1-naphthol is reduced with sodium hydrosulfite to the diaminonaphthol, which is acetylated to give 2,4-diacetamido-1-naphthol. Ferric chloride treatment of the latter gives 2-acetamido-1,4-naphthoquinone, which on hydrolysis with sulfuric acid yields the 2-amino-1,4-naphthoquinone. The 2-substituted amino-1,4-napthoquinones are prepared by the method of Baltzly and Lorz, J. Am. Chem. Soc., 70, 861 (1948), and Crosby and Lutz, J. Am. Chem. Soc., 78, 1233 (1956), which consists in the treatment of a solution of 1,4-naphthoquinone and the selected amine and cupric acetate monohydrate in methanol with oxygen. 2-amino-3-chloro-1,4-naphthoquinone is prepared by the reaction of 2,3-dichloro-1,4-naphthoquinone with ammonia according to the procedure of Hoover and Day, J. Am. Chem. Soc., 76, 4148 (1954). The 2-substituted amino-3-chloro-1,4-naphthoquinones are prepared by the reaction of the appropriate amine with the dichloronaphthoquinone according to Plagemann, Berichte, 15, 484 (1882).

The chemicals of the present invention may be applied to soil before emergence of weeds as pre-emergence herbicides. They may be applied to the growing weeds in soil as post-emergence herbicides. In the case of aquatic weeds, the chemicals may be applied to the weeds and the water containing the weeds. The chemicals may be applied as dusts when admixed with a powdered solid carrier, such as various mineral silicates, e.g. mica, talc, pyrophillite and clays. The chemicals may be mixed with surface-active dispersing agents, as herbicidal concentrates, to facilitate dispersing in water and to improve the wetting properties when used as sprays. If desired, the chemicals may be mixed with a powdered solid carrier together with a surface-active dispersing agent so that a wettable powder may be obtained which may be applied directly, or which may be shaken up with water to make an aqueous dispersion for application in that form. The chemicals may be dissolved in an oil such as a hydrocarbon or chlorinated hydrocarbon oil, and the oil solution of the chemical dispersed in water with the aid of a surface-active dispersing agent to give a sprayable aqueous dispersion. The chemicals may be applied by the aerosol method.

The following illustrates the invention.

*Example 1*

This example illustrates the pre-emergence control of weeds.

To evaluate the chemicals of the invention as pre-emergent herbicides a measured amount (¼ teaspoon) of a mixture of weed seeds is spread evenly over the surface of a sandy-loam soil contained in a 6 inch pot. The weed seed mixture is made up of five broadleaved species, namely, pigweed (Amaranthus spp.), purslane (Portulaca spp.), quickweed (Galinsoga spp.), ragweed (Ambrosia spp.) and lamb's quarters (Chenopodium spp.) and three grass types, namely crab grass (Digitaria spp.), barnyard grass (Echinochloa spp.) and foxtail (Setaria spp.). The seed is covered with ¼" to ⅛" of soil and the chemical dispersed in water is spread evenly over the soil surface. Application of 40 mg. of chemical per pot is equivalent to a rate of 20 lbs. per acre. Duplicate pots are run for each chemical and the effectiveness of the compound is determined two weeks later by estimating the percent kill of the weeds compared to the untreated check pots. Percent weed control when the chemical is applied at a rate of 20 lbs. per acre is shown in the following table.

| Chemical: | Percent weed control |
|---|---|
| 2-amino-1,4-naphthoquinone | 97 |
| 2-monomethylamino-1,4-naphthoquinone | 97 |
| 2-monoethylamino-1,4-naphthoquinone | 94 |
| 2-dimethylamino-1,4-naphthoquinone | 94 |
| 2-diethylamino-1,4-naphthoquinone | 94 |
| 2-di-n-propylamino-1,4-naphthoquinone | 94 |
| 2-amino-3-chloro-1,4-napthoquinone | 97 |

*Example 2*

This example illustrates the post-emergence control of weeds.

To evaluate the chemicals of the invention as post-emergent herbicides a measured amount (¼ teaspoon) of the weed seed used in Example 1 is spread evenly over the surface of a rich sandy-loam soil contained in a 4" x 4" x 4" box. The germinating seeds are maintained under a 16-hour light and an 8-hour dark exposure per 24-hour period and at a temperature of 75° F. for 10 days. At this time the broadleaved weed species are approximately 1½" tall and the grassy weed species have leaves 4" to 5" long. Duplicate boxes of weeds are sprayed to runoff with aqueous dispersions of the chemicals at a number of concentrations, the aqueous dispersions containing a small amount, about 0.01%, of a surface-active dispersing agent which is a reaction product of ethylene oxide and an alkyl phenol. The effectiveness of the compounds is determined after 10 days by estimating the percent control of the weeds compared to the untreated check boxes. Data are recorded as the concentration of chemical in parts per million required to kill 90% of the weeds (LD-90). These concentrations are converted to pounds of chemical per acre rate (lbs./A.) required to kill 90% of the weeds, spraying to runoff being equivalent to spraying a volume of 250 gallons per acre under normal field conditions. The pounds of chemicals per acre rate to kill 90% of the weeds are shown in the following table.

| Chemical: | LD–90 (lbs./A.) |
|---|---|
| 2-monomethylamino-1,4-naphthoquinone | 10 |
| 2-monoethylamino-1,4-naphthoquinone | 4 |
| 2-dimethylamino-1,4-naphthoquinone | 1 |
| 2-diethylamino-1,4-naphthoquinone | 1.5 |
| 2-monoisopropylamino-1,4-naphthoquinone | 1.5 |
| 2-di-n-propylamino-1,4-naphthoquinone | 2 |
| 2-mono-sec-butylamino-1,4-naphthoquinone | 1 |
| 2-di-n-butylamino-1,4-naphthoquinone | 10 |
| 2-dimethylamino-3-methyl-1,4-naphthoquinone | 2 |
| 2-amino-3-chloro-1,4-naphthoquinone | 8 |
| 2-monoethylamino-3-chloro-1,4-naphthoquinone | 10 |
| 2-dimethylamino-3-chloro-1,4-naphthoquinone | 10 |

*Example 3*

This example gives data on field tests on growing weeds.

The chemicals of the invention are dissolved in an oil which is a mixture of methylated naphthalenes, and the oil solutions of the chemicals are dispersed in water with the aid of a surface-active dispersing agent which is the reaction product of ethylene oxide and an alkyl phenol. The concentrations of the chemicals in the aqueous dispersions are such that ¼ pound per acre and ½ pound per acre of the chemicals are applied when 30 gallons of the emulsions are sprayed per acre.

Field plots 10 feet x 20 inches of growing weeds, primarily pigweed (Amaranthus spp.), and some unidentified annual grasses are sprayed with the aqueous dispersions of the chemicals at a rate of 30 gallons per acre to give ¼ pound per acre and ½ pound per acre rates of applications of the chemicals. Duplicate plots are sprayed at each dosage. The effectiveness of the compounds is determined after 7 days by estimating the percent control of the weeds compared to the untreated check plots. Results are shown in the following table.

| Chemical (at ¼ lb./acre rate): | Percent weed control |
|---|---|
| 2-dimethylamino-1,4-naphthoquinone | 90 |
| 2-diethylamino-1,4-naphthoquinone | 94 |
| 2-monoisopropylamino-1,4-naphthoquinone | 80 |
| 2-dimethylamino-1,4-naphthoquinone | 97 |
| 2-diethylamino-1,4-naphthoquinone | 94 |
| 2-monoisopropylamino-1,4-naphthoquinone | 94 |

*Example 4*

This example illustrates the control of aquatic weeds.

A number of dishes with dimensions 4" x 4" x 2" are half filled with water (½ pint), and a soluble fertilizer (10% nitrogen, 52% phosphorus and 17% potassium content) is added to a final concentration of 200 p.p.m. in the water. The pH of the solution is seven.

A sufficient number of duckweed (*Spirodela polyrhiza* (L.) Schleid) plants or fronds are transferred from a stock culture to cover one-half of the surface area of the dishes.

Aqueous dispersions of various chemicals are sprayed on the duckweed and water in separate dishes at a rate of 30 gallons per acre and with concentrations of the chemicals to give ½ pound per acre and 1 pound per acre rates of application of the chemicals. Duplicate dishes are sprayed at each concentration of each chemical. Activity of the chemicals is determined five days later by determining the percent kill of the duckweed fronds compared to the untreated control. Results are shown in the following table.

| Chemical (at ½ lb./acre rate): | Percent kill |
|---|---|
| 2-amino-1,4-naphthoquinone | 100 |
| 2-dimethylamino-1,4-naphthoquinone | 100 |
| 2-amino-3-chloro-1,4-naphthoquinone | 100 |
| 2-dimethylamino-3-chloro-1,4-naphthoquinone | 97 |

| Chemical (at 1 lb./acre rate): | Percent kill |
|---|---|
| 2-amino-1,4-naphthoquinone | 100 |
| 2-monomethylamino-1,4-naphthoquinone | 100 |
| 2-monoethylamino-1,4-naphthoquinone | 100 |
| 2-dimethylamino-1,4-naphthoquinone | 100 |
| 2-diethylamino-1,4-naphthoquinone | 100 |
| 2-di-n-propylamino-1,4-naphthoquinone | 100 |
| 2-di-n-butylamino-1,4-naphthoquinone | 99 |
| 2-dimethylamino-3-methyl-1,4-naphthoquinone | 99 |
| 2-amino-3-chloro-1,4-naphthoquinone | 100 |
| 2-dimethylamino-3-chloro-1,4-naphthoquinone | 100 |

Having thus described our invention, what we claim and desire to protect by Letters Patent is:

1. The method of destroying weeds which comprises applying to said weeds a chemical having the general formula

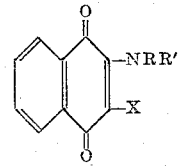

wherein R and R' are each a member selected from the group consisting of hydrogen and alkyl radicals having 1 to 4 carbon atoms, and X is a member selected from the group consisting of hydrogen and methyl and chlorine, said chemical being applied at a rate effective to kill the weeds.

2. The method of controlling weeds which comprises applying to soil containing weed seeds a chemical having the general formula

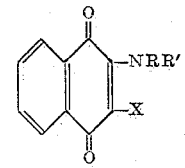

wherein R and R' are each a member selected from the group consisting of hydrogen and alkyl radicals having 1 to 4 carbon atoms, and X is a member selected from the group consisting of hydrogen and methyl and chlorine, said chemical being applied at a rate effective to kill the weeds.

3. The method of controlling weeds which comprises applying to the area supporting the growth of said weeds a chemical having the general formula

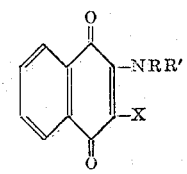

wherein R and R' are each a member selected from the group consisting of hydrogen and alkyl radicals having 1 to 4 carbon atoms, and X is a member selected from the group consisting of hydrogen and methyl and chlorine; said chemical being applied at a herbicidal rate from ¼ lb. to 20 lbs. per acre.

4. The method of destroying aquatic weeds in water which comprises contacting the weeds with a chemical having the general formula

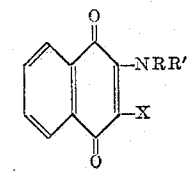

wherein R and R' are each a member selected from the group consisting of hydrogen and alkyl radicals having 1 to 4 carbon atoms, and X is a member selected from the group consisting of hydrogen and methyl and chlorine, said chemical being applied at a rate effective to kill the weeds.

5. The method of destroying weeds which comprises applying 2-dimethylamino-1,4-naphthoquinone to said weeds at a rate effective to kill the weeds.

6. The method of destroying weeds which comprises applying 2-amino-3-chloro-1,4-naphthoquinone to said weeds at a rate effective to kill the weeds.

7. The method of destroying aquatic weeds in water which comprises contacting the weeds with 2-dimethylamino-1,4-naphthoquinone at a rate effective to kill the weeds.

8. The method of controlling aquatic weeds in water which comprises contacting the weeds with 2-amino-3-chloro-1,4-naphthoquinone at a rate effective to kill the weeds.

References Cited in the file of this patent

UNITED STATES PATENTS

| | | |
|---|---|---|
| 2,349,772 | Horst | May 23, 1944 |
| 2,394,916 | Jones | Feb. 12, 1946 |
| 2,435,499 | Ladd | Feb. 3, 1948 |
| 2,577,093 | Silverman | Dec. 4, 1951 |
| 2,829,082 | O'Brien | Apr. 1, 1958 |

OTHER REFERENCES

Crocker: "Growth of Plants," Reinhold Publishing Corp., New York, 1948, pages 381 to 383.

Metcalf: "Advances in Pest Control Research," Interscience Publ. Inc., New York, vol. 1, pages 226 and 230, 1958.